United States Patent
Buchler et al.

(10) Patent No.: US 8,839,697 B2
(45) Date of Patent: Sep. 23, 2014

(54) WIPER ATTACK ANGLE ADJUSTMENT TOOL

(75) Inventors: Gary P. Buchler, Stanfield, AZ (US); Ronald H. Root, Mesa, AZ (US); Aaron T. Bickel, Chandler, AZ (US); Matthew C. LaPaglia, Chandler, AZ (US)

(73) Assignee: Nissan North America, Inc., Franklin, TN (US)

( * ) Notice: Subject to any disclaimer, the term of this patent is extended or adjusted under 35 U.S.C. 154(b) by 330 days.

(21) Appl. No.: 13/312,188

(22) Filed: Dec. 6, 2011

(65) Prior Publication Data

US 2013/0139345 A1    Jun. 6, 2013

(51) Int. Cl.
*B60S 1/34*    (2006.01)
*B60S 1/04*    (2006.01)
*B25B 13/48*    (2006.01)

(52) U.S. Cl.
CPC ............ *B60S 1/0469* (2013.01); *B25B 13/488* (2013.01)
USPC ............................................................ 81/52

(58) Field of Classification Search
CPC ........ B25B 13/00; B25B 13/02; B25B 13/08; B25B 13/48; B25B 13/488; B25B 13/50; B25B 13/5008; B25B 13/5016; B25B 13/5025; B25B 13/5033; B25B 13/5058; B25B 23/00; B25B 23/0035; B25B 23/0085; B25B 27/00; B60S 1/04; B60S 1/32; B60S 1/0469; B60S 1/3849; G01B 5/24; B60J 1/02
USPC .............. 81/55, 57.32, 13, 176.2, 176.3, 484, 81/58.2, DIG. 5
See application file for complete search history.

(56) References Cited

U.S. PATENT DOCUMENTS

| 755,569 A | * | 3/1904 | Freeland ...................... 81/57.32 |
| 1,261,006 A | | 4/1918 | Bartelt |
| 1,406,331 A | | 2/1922 | Bartelt |

(Continued)

FOREIGN PATENT DOCUMENTS

| DE | 19535048 A1 | 4/1996 |
| EP | 1514751 B1 | 10/2007 |
| GB | 338195 | 11/1930 |
| GB | 874019 | 8/1961 |

OTHER PUBLICATIONS

Wiper Attack Angle Measurement System, Operation Manual Version 2.0.4, Nissan Motor Co., Ltd., Measurement Engineering Department, Measurement and Calibration Group, Atsugi-shi, Kanagawa, Japan, prior to Dec. 2011.

*Primary Examiner* — Hadi Shakeri
(74) *Attorney, Agent, or Firm* — Global IP Counselors, LLP

(57) ABSTRACT

A wiper attack angle adjustment tool has a pair of wiper arm wrenches and a coupling member. Each wiper arm wrench includes a handle portion and a wiper arm holding portion having a jaw defining a wiper arm gripping slot with a wiper arm insertion opening. The coupling member pivotally couples the second wiper arm wrenches together about a single pivot axis passing through the wiper arm gripping slots. The coupling member has a wiper arm receiving space partially surrounding the single pivot axis and axially aligned with the wiper arm gripping slots along the single pivot axis. The wiper arm receiving space also defines a wiper arm insertion opening. The wiper arm insertion openings are arranged relative to the single pivot axis such that the wiper arm wrenches and the coupling member are configured to engage a wiper arm in a direction transverse to the single pivot axis.

20 Claims, 9 Drawing Sheets

(56) References Cited

U.S. PATENT DOCUMENTS

| | | | |
|---|---|---|---|
| 1,572,986 A | 2/1926 | Brewster | |
| 1,708,147 A | 4/1929 | Miller | |
| 1,734,270 A * | 11/1929 | Olson | 81/55 |
| 1,980,073 A * | 11/1934 | Melvin | 81/55 |
| 2,078,631 A * | 4/1937 | Gagne | 81/124.6 |
| 2,283,625 A | 5/1942 | Coplen | |
| 2,790,343 A * | 4/1957 | White | 81/55 |
| 2,952,178 A | 9/1960 | Buchheim | |
| 4,718,317 A | 1/1988 | Hensler | |
| 7,073,411 B2 * | 7/2006 | Primrose et al. | 81/58.2 |
| 7,862,269 B2 | 1/2011 | Kovie | |

\* cited by examiner

WIPER ATTACK ANGLE ADJUSTMENT TOOL

BACKGROUND

1. Field of the Invention

The present invention generally relates to a wiper attack angle adjustment tool. More specifically, the present invention relates to a wiper attack angle adjustment tool that is used to apply a torsional or twisting force to a wiper arm.

2. Background Information

Most motor vehicles, including trains, aircraft and watercraft, are equipped with one or more windshield wipers. The windshield wiper is used to remove rain and debris from a windshield. A windshield wiper generally includes a wiper arm and a wiper blade assembly. The wiper arm has a base end pivotally mounted to the vehicle and a free end pivotally supporting the wiper blade assembly. A motor is operatively connected to the base end of the wiper arm such that a long rubber blade of the wiper blade assembly is swung back and forth over the glass of the windshield to push water from its surface. The speed is normally adjustable, with several continuous speeds and often one or more intermittent settings. Most automobiles use two synchronized radial type arms, while many commercial vehicles use one or more pantograph arms.

The angle at which the tip of the rubber blade contacts the surface of the glass of the windshield is often called contact angle between the rubber blade and the glass. The contact angle can be adjusted by changing the attack angle of the windshield wiper. The attack angle of the windshield wiper refers to an angle formed between a center plane of the wiper arm and a reference line that is perpendicular to a tangent line of the contact point of the tip of the rubber blade on the surface of the glass of the windshield. The attack angle of the windshield wiper is adjusted by twisting the free end of the wiper arm. In particular, two adjustable open end wrenches or pliers are inserted over the wiper arm near the connection to the wiper blade assembly. Then, the wrenches or pliers are moved apart from each other to twist the wiper arm. The twisting should be sufficient enough so that the desired twisted amount is set in the wiper arm once the forces from the wrenches or pliers are released. The resulting new attack angle of the wiper to the windshield should be such that the center plane of the wiper arm is either perpendicular to the windshield or tilted slightly in the direction of movement of the wiper blade from the park or home position.

SUMMARY

The conventional procedure of using two adjustable open end wrenches or pliers has some drawbacks. For example, it is often difficult to make fine adjustments with the conventional procedure. Moreover, with conventional procedure, the wrenches or pliers are sometimes difficult to handle without damaging the vehicle.

One aspect of the present disclosure is to provide a wiper attack angle adjustment tool that is easy to handle and convenient to use.

In view of the state of the known technology, a wiper attack angle adjustment tool is provide that basically comprises a first wiper arm wrench, a second wiper arm wrench and a coupling member. The first wiper arm wrench includes a first handle portion and a first wiper arm holding portion having a first jaw defining a first wiper arm gripping slot with a first wiper arm insertion opening. The second wiper arm wrench includes a second handle portion and a second wiper arm holding portion having a second jaw defining a second wiper arm gripping slot with a second wiper arm insertion opening. The coupling member pivotally couples the first and second wiper arm wrenches together about a single pivot axis passing through the first and second wiper arm gripping slots. The coupling member has a wiper arm receiving space partially surrounding the single pivot axis and axially aligned with the first and second wiper arm gripping slots along the single pivot axis. The wiper arm receiving space defines a third wiper arm insertion opening. The first, second and third wiper arm insertion openings are arranged relative to the single pivot axis such that the first and second wiper arm wrenches and the coupling member are configured to engage a wiper arm in a direction transverse to the single pivot axis.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
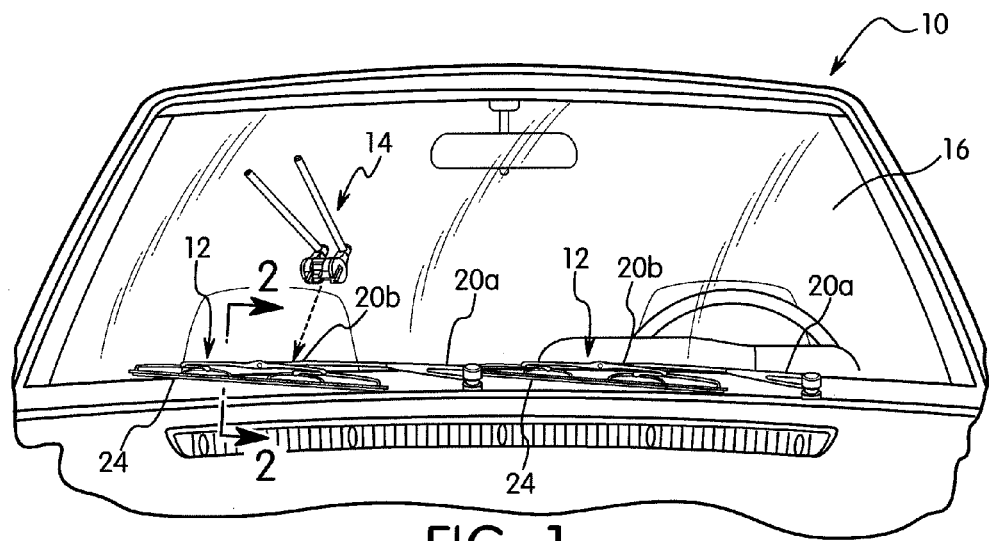
FIG. 1 is a partial front elevational view of a vehicle with a pair of windshield wipers with a wiper attack angle adjustment tool in accordance with one embodiment being positioned to be applied to a wiper arm of the windshield wiper on the passenger side.

Referring initially to FIG. 1, a vehicle 10 is illustrated with a pair of windshield wipers 12 with a wiper attack angle adjustment tool 14 in accordance with one embodiment about to be positioned on the windshield wiper 12 that is located on the passenger side of the vehicle 10. The windshield wipers 12 are used to remove rain and debris from a windshield 16 of the vehicle 10 in a conventional manner. As explained below, the wiper attack angle adjustment tool 14 is used to adjust the windshield wiper 12 relative to the upper surface of the windshield 16.

Figure 2:
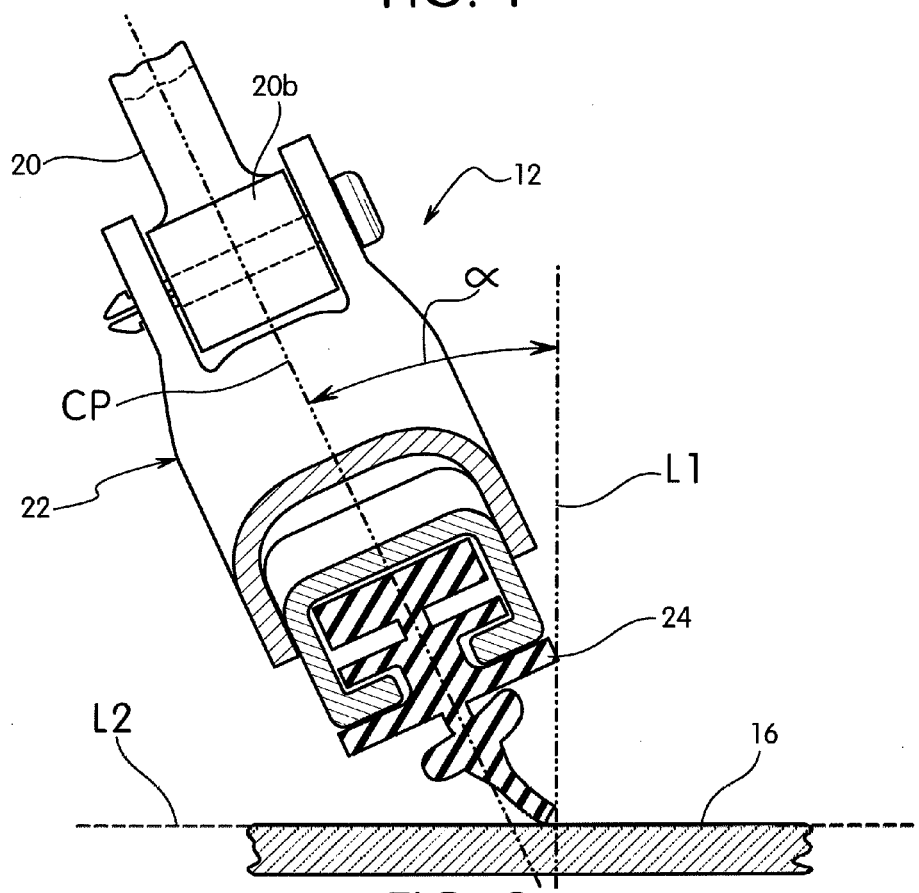
FIG. 2 is a partial cross sectional view of the windshield wiper and the windshield as seen along section line 2-2 of FIG. 1.

As seen in FIGS. 1 and 2, the windshield wipers 12 are conventional windshield wipers with each having a wiper arm 20 and a wiper blade assembly 22. The wiper arm 20 has a base end 20a pivotally mounted to the vehicle 10 and a free end 20b pivotally supporting the wiper blade assembly 22. A motor (not shown) is operatively connected to the base end 20a of the wiper arm 20 such that a long rubber blade 24 of the wiper blade assembly 22 is swung back and forth over the windshield 16 to push water from its surface.

As seen in FIG. 2, the windshield wiper 12 is position on the upper surface of the windshield 16 such that an attack angle α is formed. The attack angle α of the windshield wiper 12 refers to an angle formed between a center plane CP of the wiper arm 20 and a reference line L1 that is perpendicular to a tangent line L2 of the contact point of the tip of the rubber blade 24 on the surface of the windshield 16. The attack angle α of the windshield wiper 12 is adjusted by applying a torsional force on the wiper arm 20 for twisting the free end 20b of the wiper arm 20 about its center longitudinal axis CA. This twisting of the wiper arm 20 changes the contact angle of the rubber blade 24 with the surface of the windshield 16. The wiper attack angle adjustment tool 14 is provided for adjusting the attack angle α of the windshield wiper 12 by holding the wiper arm 20 in two axially spaced apart locations and then twisting the wiper arm 20 along the center longitudinal axis CA as best seen in FIGS. 3 and 4.

Now the wiper attack angle adjustment tool 14 will be discussed in more detail with reference to FIGS. 3 to 10. Basically, the wiper attack angle adjustment tool 14 includes a first wiper arm wrench 30, a second wiper arm wrench 32 and a coupling member 34. The coupling member 34 rotatably couples the first and second wiper arm wrenches 30 and 32 together about a single pivot axis P. When the wiper attack angle adjustment tool 14 is applied to the wiper arm 20, a torsional force is applied to the wiper arm 20 by applying force to each of the first and second wiper arm wrenches 30 and 32 in opposite directions about the pivot axis P.

Figure 3:
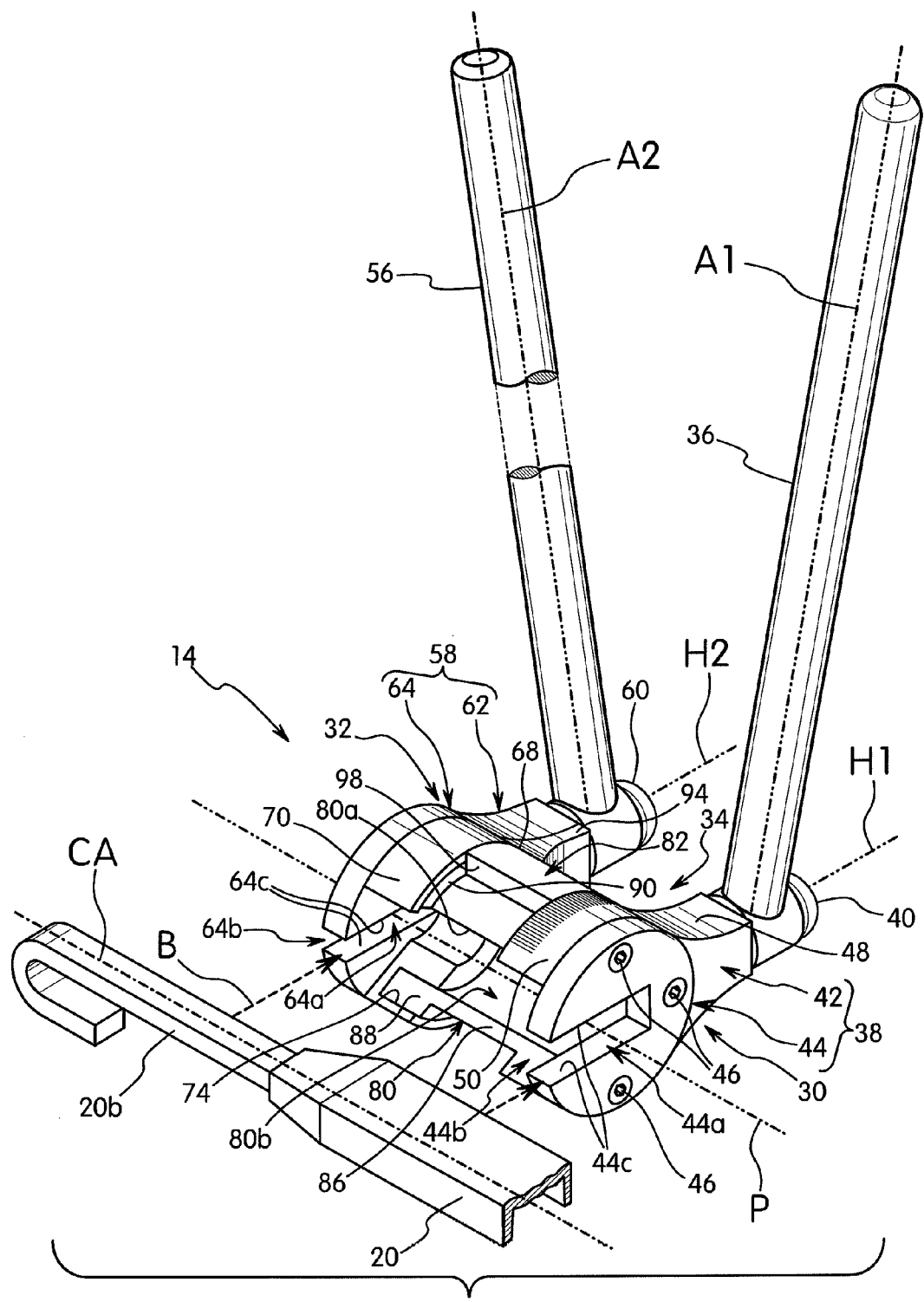
FIG. 3 is a perspective view of a portion of the wiper arm and the wiper attack angle adjustment tool prior to the wiper attack angle adjustment tool being positioned on the wiper arm.
Figure 4:
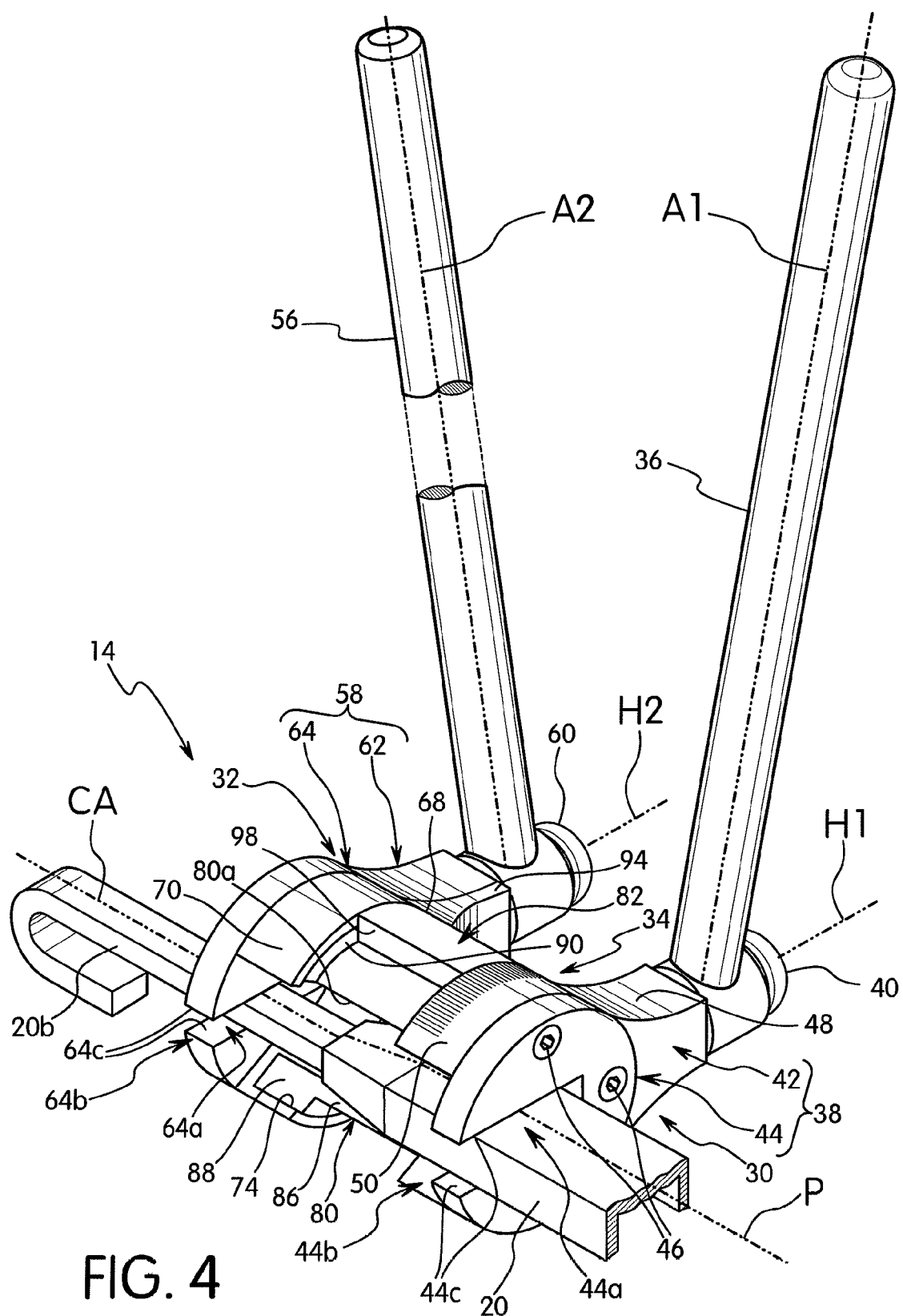
FIG. 4 is a perspective view of a portion of the wiper arm and the wiper attack angle adjustment tool installed on the wiper arm.
Figure 5:
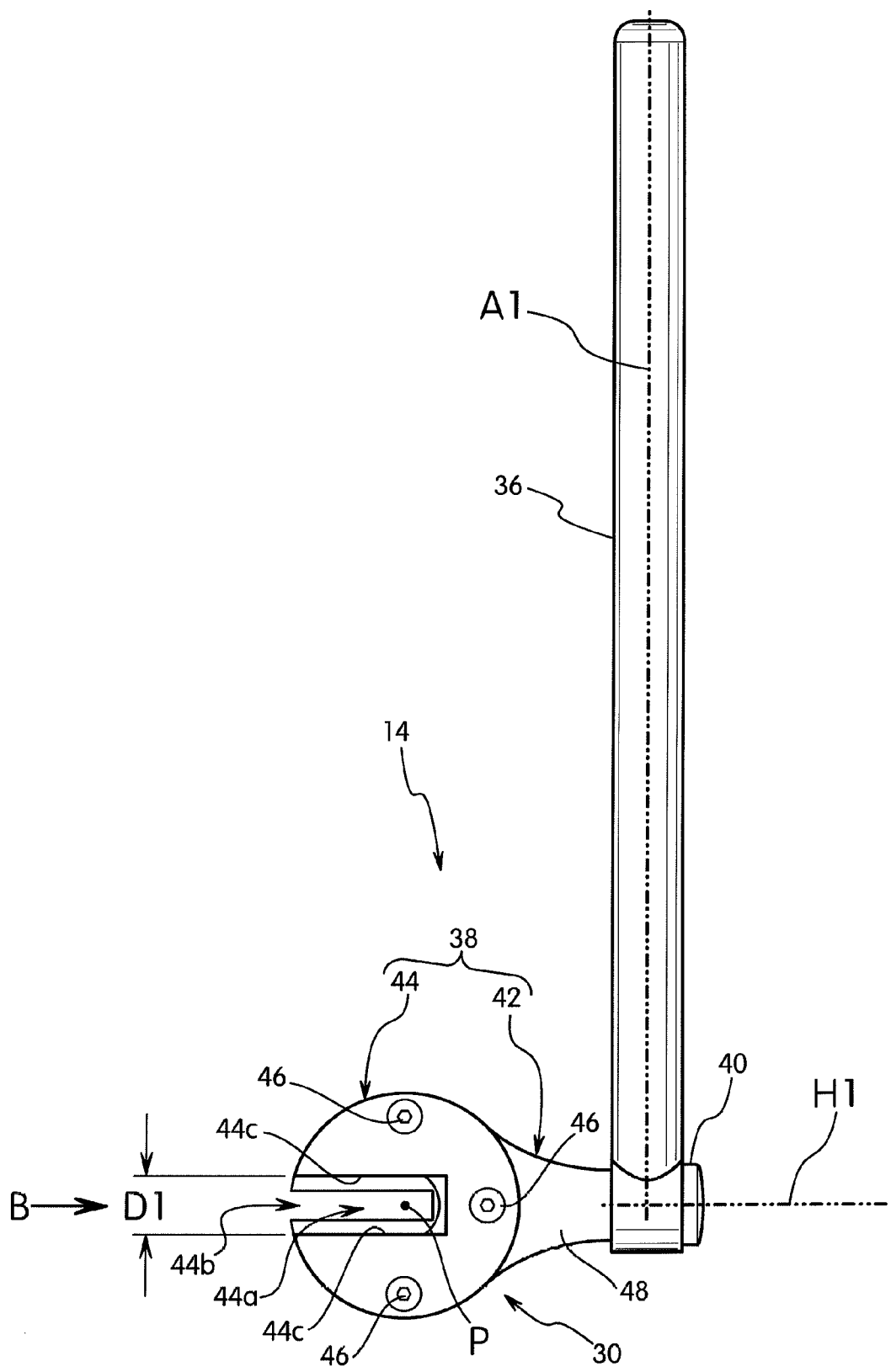
FIG. 5 is a first end elevational view of the wiper attack angle adjustment tool illustrated in FIGS. 1 to 4.

As seen in FIGS. 3 to 5, the first wiper arm wrench 30 includes a first handle portion 36 and a first wiper arm holding portion 38. The first handle portion 36 is fixedly attached to the wiper arm holding portion 38 by a first fastener 40 (e.g., a bolt in the illustrated embodiment). Preferably, the first handle portion 36 is pivotally mounted to the first wiper arm holding portion 38 by loosening the first fastener 40 that extends along the first handle pivot axis H1. In this way, the first handle portion 36 is adjustably attached to the first wiper arm holding portion 38 by the first fastener 40 for selectively maintaining the first handle portion 36 in one of a plurality of positions with respect to the wiper arm holding portion 38. In other words, the first handle portion 36 has a first longitudinal axis A1 that is transverse to a wiper insertion direction B as seen in FIGS. 3 and 5. While the first handle portion 36 is illustrated as a solid rod shaped gripping section, the first handle portion 36 can be provided with a rubber or plastic grip (e.g., via an over-molding process) for the user to more comfortably grip the first handle portion 36.

The first wiper arm holding portion 38 includes a first base member 42 and a first jaw 44. Preferably, the first base member 42 and the first jaw 44 are formed of a hard rigid material such as a metal material that is typically used for wrenches. The first jaw 44 is removably attached to the first base member 42 by three fasteners 46 (e.g., three screws in the illustrated embodiment). In this way, the first jaw 44 can be replaced if damaged or exchanged with a different size jaw if needed and/or desired. Alternatively, the first base member 42 and the first jaw 44 can be integrally formed if needed and/or desired.

Figure 9:
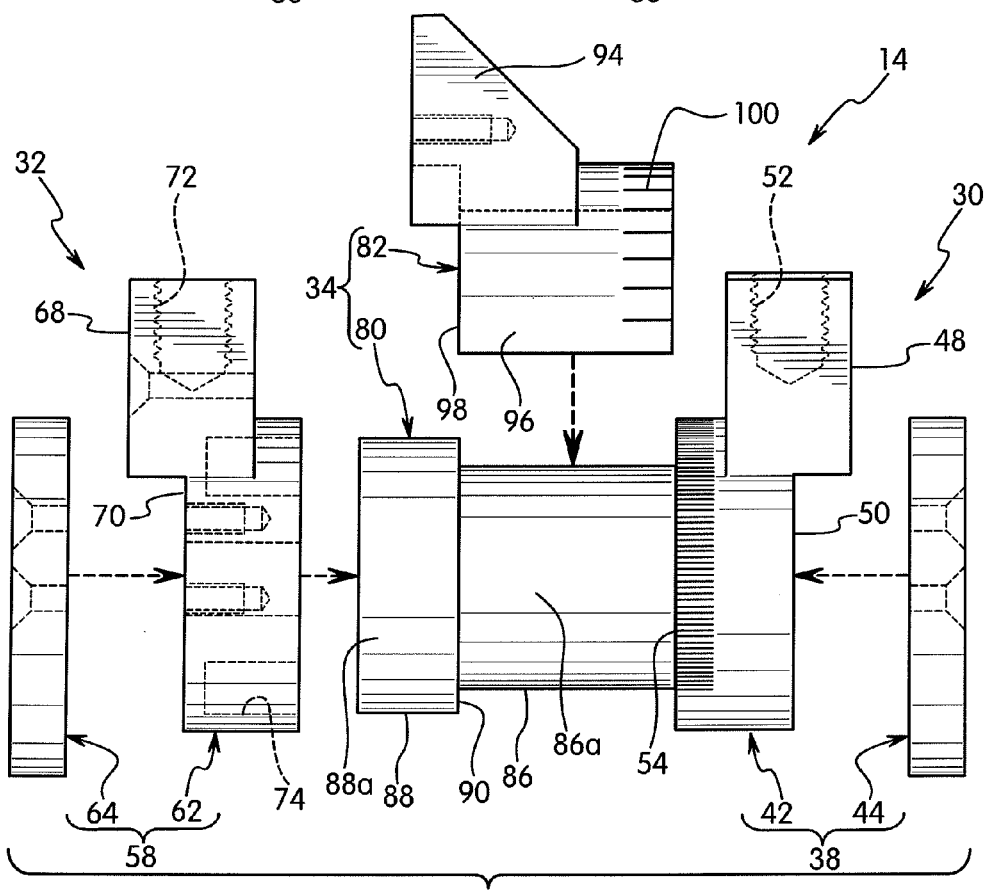
FIG. 9 is an exploded plan view of the wiper attack angle adjustment tool illustrated in FIGS. 1 to 8 without associated handles shown removed.

The first base member 42 includes a handle attachment part 48 and a jaw attachment part 50. The handle attachment part 48 and the jaw attachment part 50 are integrally formed as a one-piece, unitary member in the illustrated embodiment. The handle attachment part 48 and the jaw attachment part 50 are preferably formed of a suitable rigid material such as a metallic material. However, the handle attachment part 48 and the jaw attachment part 50 can be fixedly attached to one another if needed and/or desired. As seen in FIG. 9, the handle attachment part 48 has a threaded hole 52 for threadedly receiving the first fastener 40. The jaw attachment part 50 includes indicia such as calibration marks 54 that form a gauge for indicating the amount of relative pivotal movement between first and second wiper arm wrenches 30 and 32. For example, the gauge may comprise scalar demarcations formed on or applied to the jaw attachment part 50.

As best seen in FIG. 5, the first jaw 44 defines a first wiper arm gripping slot 44a with a first wiper arm insertion opening 44b. In particular, the first jaw 44 has a pair of first engagement surfaces 44c defining the first wiper arm gripping slot 44a and the arm insertion opening 44b. The first engagement surfaces 44c further define a first fixed predetermined width or dimension D1 therebetween of the first wiper arm gripping slot 44a at the pivot axis P. While the fixed predetermined width D1 of the first wiper arm gripping slot 44a of the first jaw 44 is non-adjustable in the illustrated embodiment, it will be apparent from this disclosure that the first jaw 44 can be adjustable to vary the width D1 at the pivot axis P if needed and/or desired.

Figure 6:
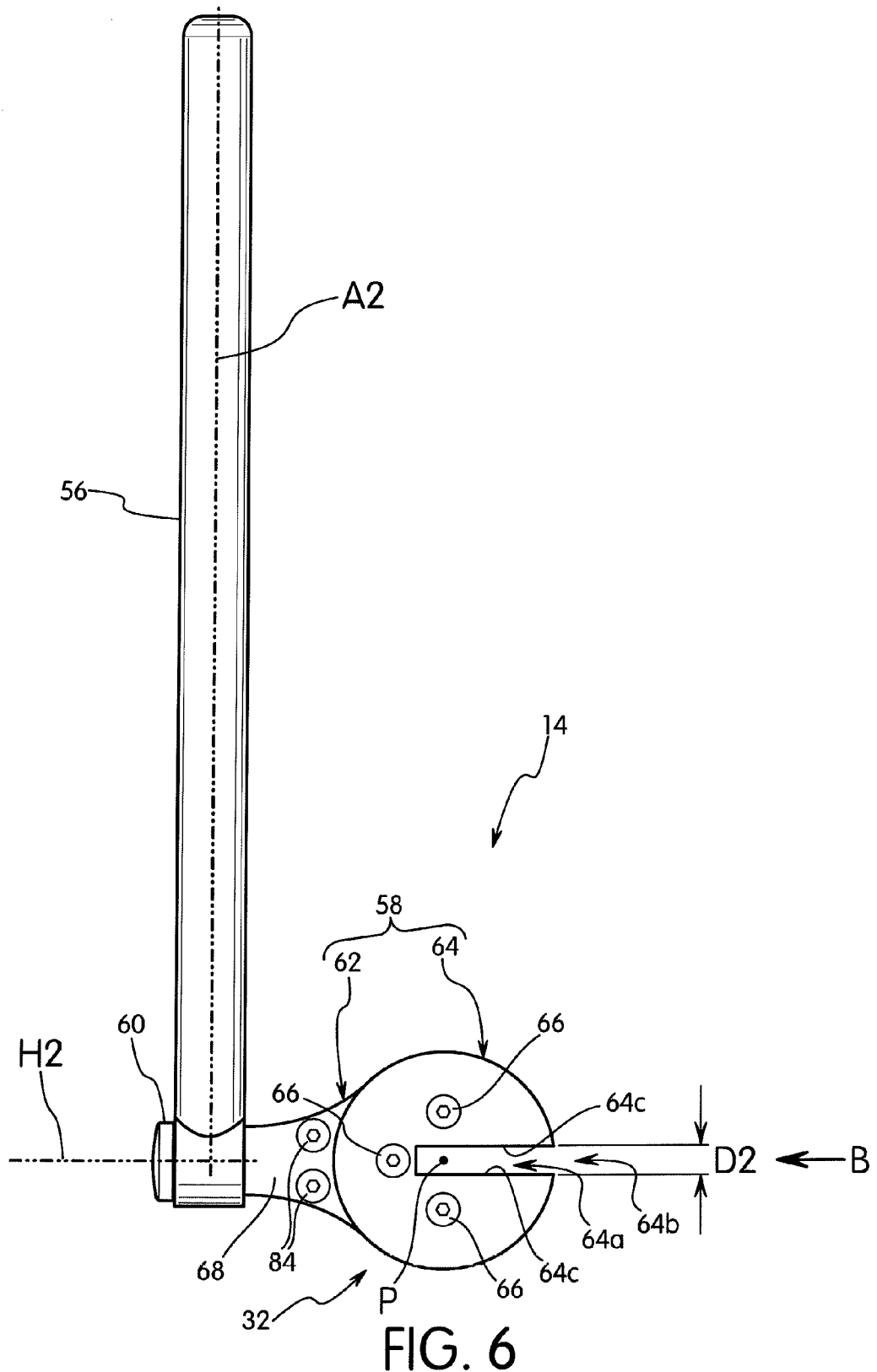
FIG. 6 is a second end elevational view of the wiper attack angle adjustment tool illustrated in FIGS. 1 to 5.

As seen in FIGS. 3, 4 and 6, the second wiper arm wrench 32 includes a second handle portion 56 and a second wiper arm holding portion 58. The second handle portion 56 is fixedly attached to the second wiper arm holding portion 58 by a second fastener 60 (e.g., a bolt in the illustrated embodiment). Preferably, the second handle portion 56 is pivotally mounted to the second wiper arm holding portion 58 by loosening the fastener 60 that extends along the second pivot handle axis H2. In this way, the second handle portion 56 is adjustably attached to the second wiper arm holding portion 58 by the second fastener 60 for selectively maintaining the second handle portion 56 in one of a plurality of positions with respect to the second wiper arm holding portion 58. In other words, the second handle portion 56 has a second longitudinal axis A2 that is transverse to a wiper insertion direction B as seen in FIGS. 3 and 6. While the second handle portion 56 is illustrated as a solid rod shaped gripping section, the first handle portion 36 can be provided with a rubber or plastic grip for the user to more comfortably grip the second handle portion 56.

The second wiper arm holding portion 58 includes a second base member 62 and a second jaw 64. Preferably, the second base member 62 and the second jaw 64 are formed of a hard rigid material such as a metal material that is typically used for wrenches. The second jaw 64 is removably attached to the second base member 62 by three fasteners 66 (e.g., three screws in the illustrated embodiment). In this way, the second jaw 64 can be replaced if damaged or exchanged with a different size jaw if needed and/or desired. Alternatively, the second base member 62 and the second jaw 64 can be integrally formed if needed and/or desired.

The second base member 62 includes a handle attachment part 68 and a jaw attachment part 70. The handle attachment part 68 and the jaw attachment part 70 are integrally formed as a one-piece, unitary member in the illustrated embodiment.

The handle attachment part 68 and the jaw attachment part 70 are preferably formed of a suitable rigid material such as a metallic material. However, the handle attachment part 68 and the jaw attachment part 70 can be fixedly attached to one another if needed and/or desired. As best seen in FIG. 9, the handle attachment part 68 has a threaded hole 72 for threadedly receiving the second fastener 60. The jaw attachment part 70 includes an arc shaped recess 74 for engaging the coupling member 34 as discussed below.

As best seen in FIG. 6, the second jaw 64 defines a second wiper arm gripping slot 64a with a second wiper arm insertion opening 64b. In particular, the second jaw 64 has a pair of second engagement surfaces 64c defining the second wiper arm gripping slot 64a and the second wiper arm insertion opening 64b. The second engagement surfaces 64c further define a second fixed predetermined width or dimension D2 therebetween of the second wiper arm gripping slot 64a at the pivot axis P. In the illustrated embodiment, the second width D2 of the second wiper arm gripping slot 64a is smaller than the first width D1 of the first wiper arm gripping slot 44a. However, the dimensions of the gripping slots 44a and 64a will typically depend on the particular construction of the wiper arm 20 being adjusted. While the second predetermined width D2 of the second wiper arm gripping slot 52 of the second jaw 50 is non-adjustable in the illustrated embodiment, it will be apparent from this disclosure that the second jaw 50 can be adjustable to vary the width D2 at the pivot axis P as needed and/or desired.

Figure 7:
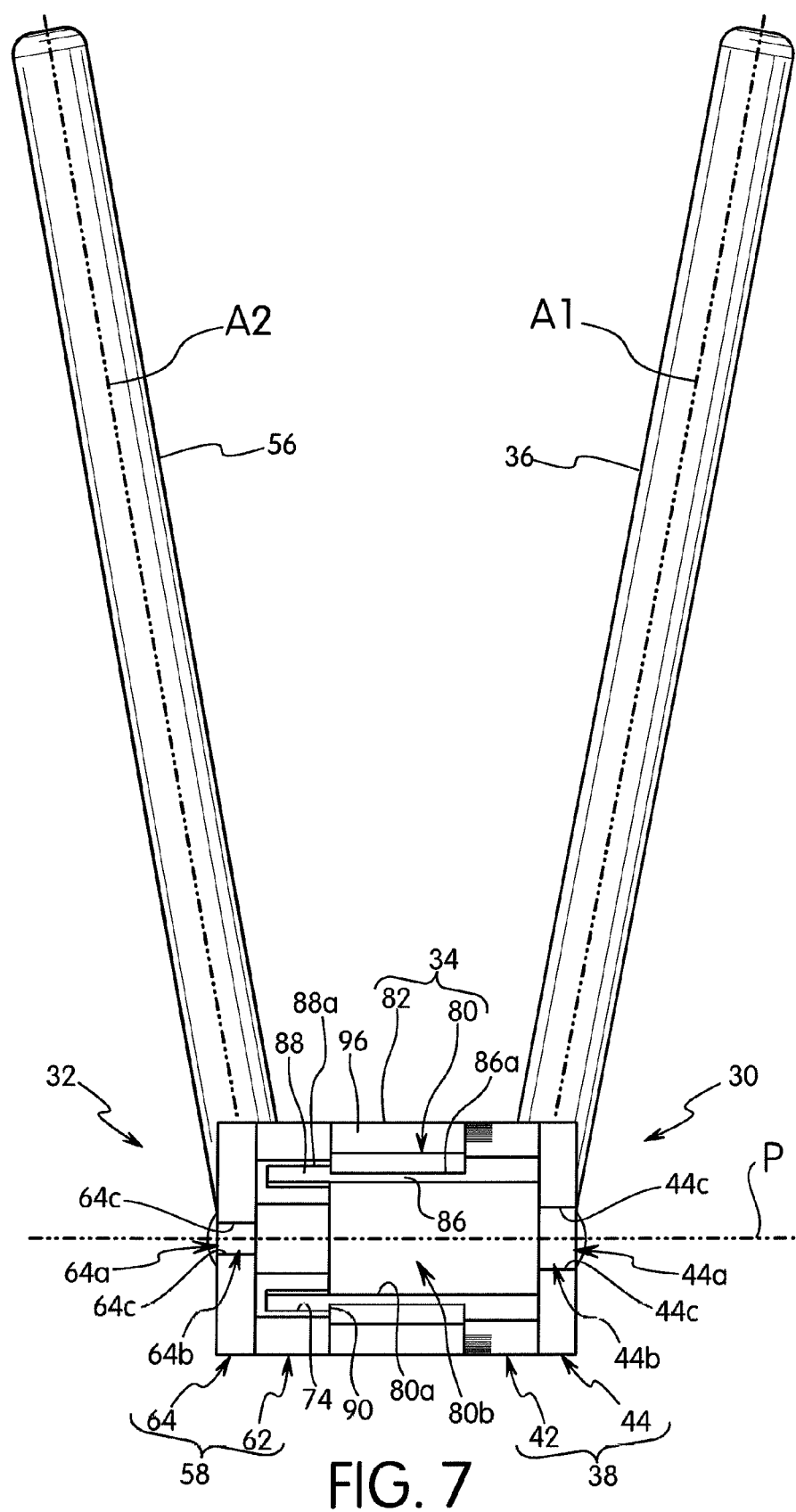
FIG. 7 is an insertion side elevational view of the wiper attack angle adjustment tool illustrated in FIGS. 1 to 6.
Figure 8:
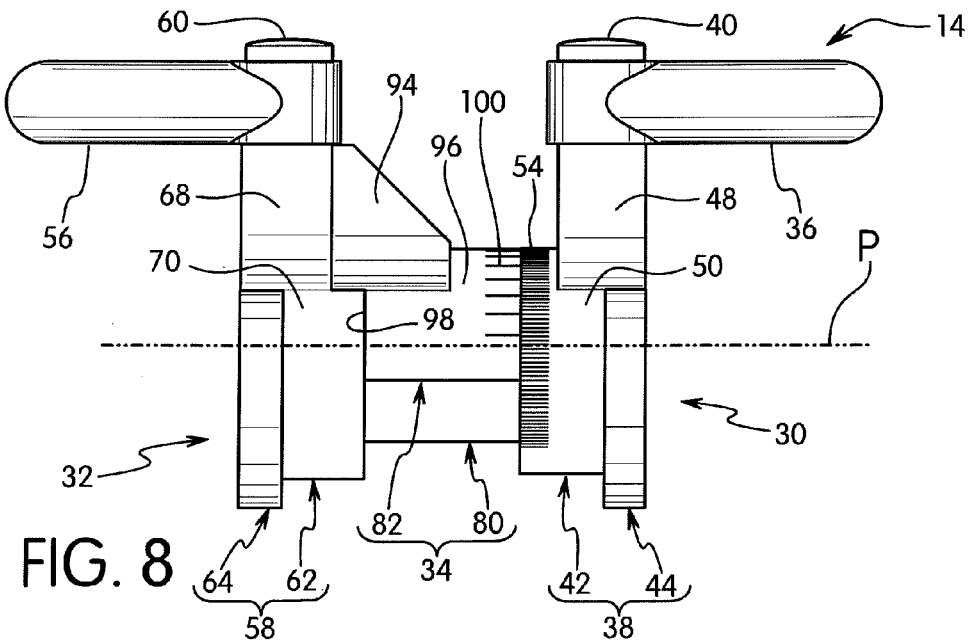
FIG. 8 is a plan view of the wiper attack angle adjustment tool illustrated in FIGS. 1 to 7.
Figure 10:
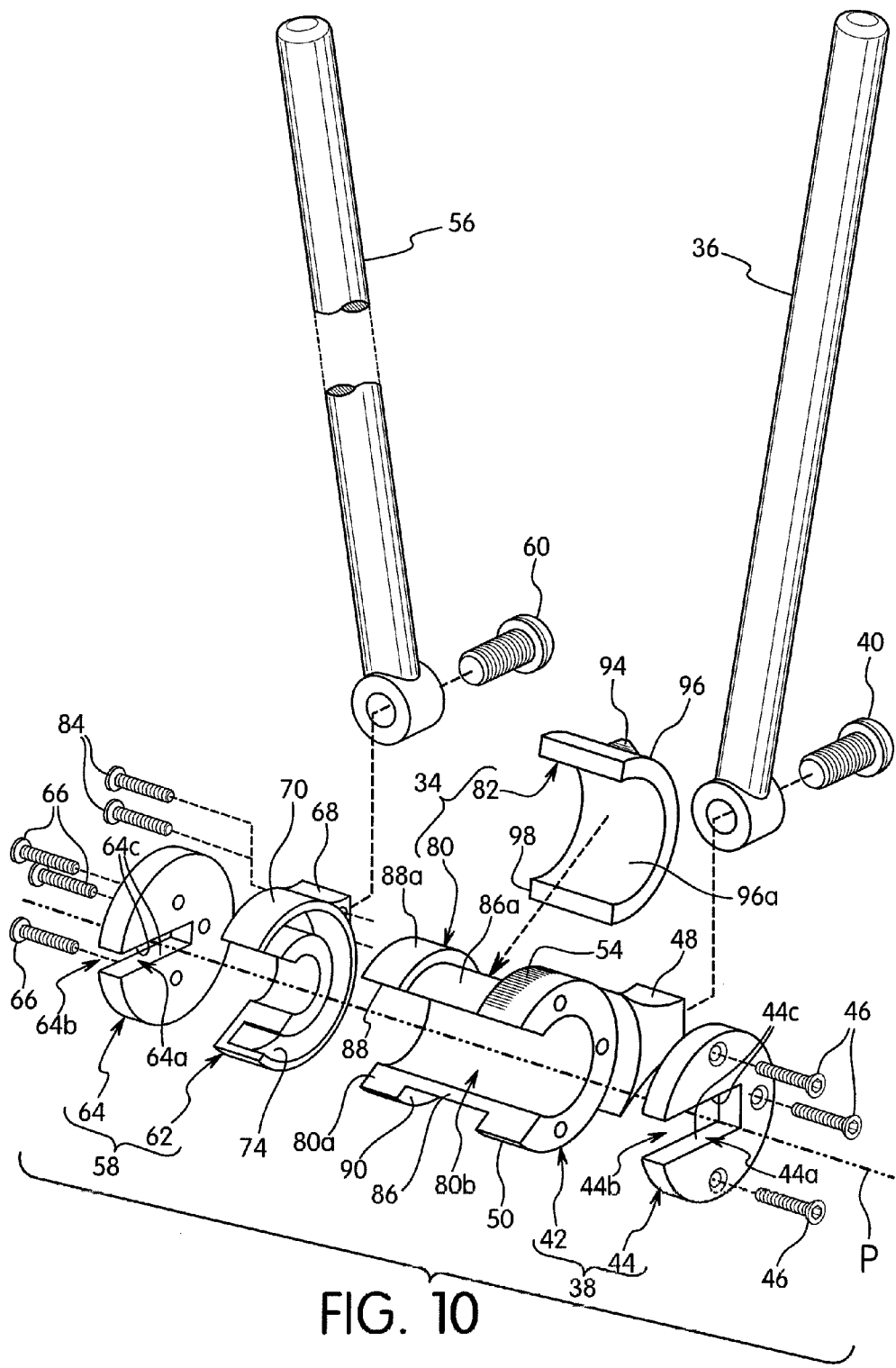
FIG. 10 is an exploded perspective view of the wiper attack angle adjustment tool illustrated in FIGS. 1 to 9.

Referring to FIG. 7, the coupling member 34 pivotally couples the first and second wiper arm wrenches 30 and 32 together about the pivot axis P, which passes through the first and second wiper arm gripping slots 44a and 64a. In the illustrated embodiment, as seen in FIGS. 8 to 10, the coupling member 34 basically includes a first pivot support part 80 and a second pivot support part 82. The first pivot support part 80 is fixed to the first wiper arm holding portion 38. The second pivot support part 82 is fixed to the second wiper arm holding portion 58. In particular, the first pivot support part 80 is integrally formed with the jaw attachment part 50 of the first base member 42, while the second pivot support part 82 is removably fixed to the handle attachment part 68 of the second base member 62 by a pair of fasteners 84 (e.g., two screws in the illustrated embodiment).

As best seen in FIGS. 9 and 10, the first pivot support part 80 includes an inner bearing portion 86 and a constrained portion 88. The inner bearing portion 86 spaces the first and second wiper arm holding portions 38 and 58 apart along the pivot axis P. Also the inner bearing portion 86 cooperates with the second pivot support part 82 to aid in maintaining alignment of the wiper arm holding portions 38 and 58 along the pivot axis P. The constrained portion 88 is rotatably disposed in the arc shaped slots recess 74 of the second wiper arm holding portion 58. In this way, the wiper arm holding portions 38 and 58 rotate smoothly about the pivot axis P.

As best seen in FIG. 10, the inner bearing portion 86 has a C-shaped cross section with a partial cylindrical outer surface 86a. The constrained portion 88 also has a C-shaped cross section with a partial cylindrical outer surface 88a. The effective outer diameter of the constrained portion 88 is larger than the effective outer diameter of the inner bearing portion 86 such that a first abutment 90 is formed where the inner bearing portion 86 is joined with the constrained portion 88. The first abutment 90 faces in an axial direction, which is parallel to the pivot axis P, towards the first wiper arm holding portion 38.

As best seen in FIG. 10, the C-shaped configurations of the inner bearing portion 86 and the constrained portion 88 define a wiper arm receiving space 80a of the coupling member 34 with a third wiper arm insertion opening 80b. The wiper arm receiving space 80a partially surrounds the pivot axis P, and is axially aligned with the first and second wiper arm gripping slots 44a and 64a along the pivot axis P. When the first, second and third wiper arm insertion openings 44b, 64b and 80b are axially aligned, the wiper arm 20 can be inserted into the first and second wiper arm gripping slots 44a, 64a and 80a. In particular, the first, second and third wiper arm insertion openings 44b, 64b and 80b are arranged relative to the pivot axis P such that the first and second wiper arm wrenches 30 and 32 and the coupling member 34 are configured to engage the wiper arm 20 in a direction transverse to the pivot axis P. The third wiper arm insertion opening 80b has a larger transverse width relative to the pivot axis P such that the first pivot support part 80 does not contact the wiper arm 20 as the first and second wiper arm holding portions 38 and 48 are rotated relative to each other about the pivot axis P during adjustment of the attack angle α of the windshield wiper 12 (see FIG. 2). The first, second and third wiper arm insertion openings 44b, 64b and 80b define and face the wiper insertion direction B that is transverse to the pivot axis P. Preferably, the center longitudinal axis CA of the wiper arm 20 is aligned or nearly aligned with the pivot axis P of the wiper attack angle adjustment tool 14 when a torsional bending force is applied to the free end 20b of the wiper arm 20 about its center longitudinal axis CA. In this way, the attack angle α of the windshield wiper 12 (see FIG. 2) can be accurately and finely adjusted without damaging the vehicle and/or the wiper arm 20.

Basically, as best seen in FIG. 7, the second pivot support part 82 retains the constrained portion 88 of the first pivot support part 80 within the arc shaped slots recess 74 of the second wiper arm holding portion 58 and cooperates with the first pivot support part 80 to maintain alignment of the wiper arm holding portions 38 and 58 along the pivot axis P. The second pivot support part 82 retains the constrained portion 88 in the arc shaped recess 74 of the second wiper arm holding portion 58. The second pivot support part 82 includes an attachment portion 94 and an outer bearing portion 96. The attachment portion 94 and the outer bearing portion 96 are integrally formed as a one-piece, unitary member of a suitable rigid material such as a metallic material or rigid non-metallic material. The attachment portion 94 is fixedly secured to the second wiper arm holding portion 48 by the fasteners 84. The outer bearing portion 96 has a C-shaped cross section with a partial cylindrical inner surface 96a. The partial cylindrical inner surface 96a partially encircles the partial cylindrical outer surface 86a of the inner bearing portion 86. The center of curvature of each of the first and second pivot support parts 80 and 82 is aligned with the pivot axis P between the first and second wiper arm wrenches 30 and 32.

As best seen in FIG. 10, the outer bearing portion 96 also has a second abutment 98 that faces in an axial direction, which is parallel to the pivot axis P, towards the second wiper arm holding portion 58. The second abutment 98 of the second pivot support part 82 is located adjacent the first abutment 90 of the first pivot support part 80. Also the second abutment 98 of the second pivot support part 82 faces in an opposite axial direction from the first abutment 90 of the first pivot support part 80. In this way, the second abutment 98 of the second pivot support part 82 contacts the first abutment 90 to restrict movement of the first pivot support part 80 relative to the second wiper arm wrench 32 and the second pivot support part 82 along the pivot axis P. In other words, as best seen in FIG. 7, the first and second abutments 90 and 98 cooperate to restrict relative movement of the first and second wiper arm holding portions 38 and 48 along the pivot axis P, but allow relative rotational movement of the first and second wiper arm holding portions 38 and 48 about the pivot axis P.

Preferably, the outer bearing portion 96 of the coupling member 34 includes indicia such as calibration marks 100 that form a gauge. The calibration marks 100 cooperate with the calibration marks 54 of the jaw attachment part 50 for indicating the amount of pivotal movement between the first and second wiper arm holding portions 38 and 58 of the first and second wiper arm wrenches 30 and 32 about the single pivot axis P relative to an initial installation position. Preferably, the indicia forming the calibration marks 54 and 100 include a symbol or number that indicates an installation position in which the first, second and third wiper arm insertion openings 44b, 64b and 80b are angularly aligned about the single pivot axis P as seen in FIG. 6. In this way, the amount of torque applied to the wiper arm 20 can be determined. For example, one or both of the calibration marks 54 and 100 can include scalar demarcations. Additionally, one of the calibration marks 54 and 100 can include scalar demarcations and the other of the calibration marks 54 and 100 can include a pointer dimensioned to align with respective ones of the scalar demarcations as the first wiper arm wrench 30 and the second wiper arm wrench 32 rotate relative to one another.

Figure 11:
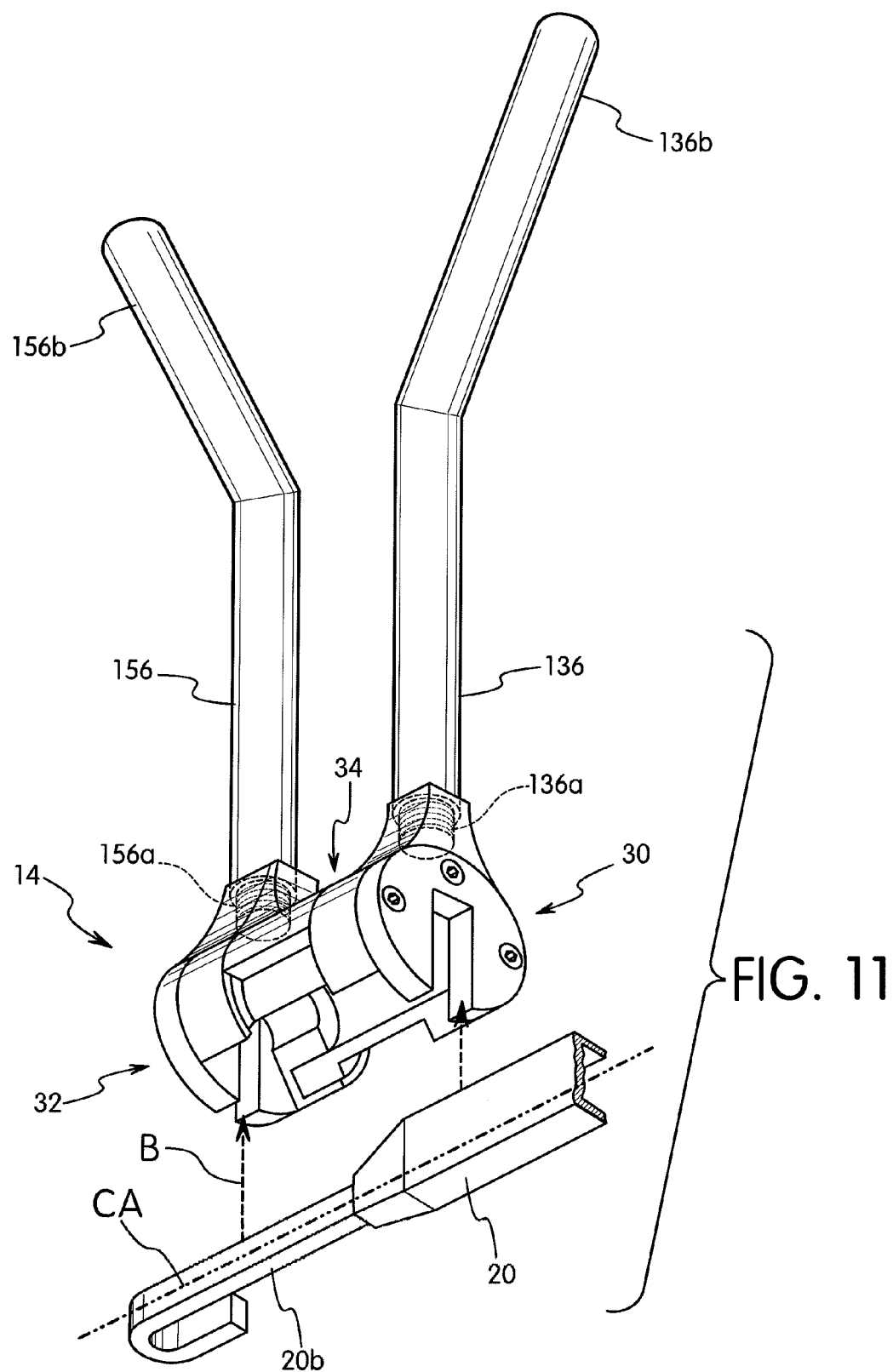
FIG. 11 is a perspective view of the wiper attack angle adjustment tool with alternative handles.

Referring now to FIG. 11, the wiper attack angle adjustment tool 14 has been modified. In particular, the first and second handle portions 36 and 56 and the first and second fasteners 40 and 60 have been replaced with alternative handle portions 136 and 156. Depending on the configuration of the wiper arms and/or the vehicle, the bent configuration of the handle portions 136 and 156 may be more suitable than the configuration of the handle portions 36 and 56 (e.g., if the wiper arm 20 is at least partially concealed by a vehicle hood when installed). The alternative handle portions 136 and 156 have attached ends 136a and 156a and free ends 136b and 156b. The attached ends 136a and 156a are threaded directly into the threaded bores. The first and second handle portions 36 and 46 are preferably configured such that the attached ends 136a and 156a are closer together than the free ends 136b and 156b. This can be accomplished by angularly arranging the first and second handle portions 36 and 46 in the threaded bores away from each another or by including one or more bends in the first and second handle portions 36 and 46 as seen in FIG. 11. While the handle portions 136 and 156 are illustrated as having solid rod shaped gripping sections, the handle portions 136 and 156 can be provided with a rubber or plastic grip for the user to more comfortably grip the handle portions 136 and 156.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the change dos not adversely affect the operation of the wiper attack angle adjustment tool. Components that are shown directly connected or contacting each other can have intermediate structures disposed between them long as the change dos not adversely affect the operation of the wiper attack angle adjustment tool. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A wiper attack angle adjustment tool comprising:
    a first wiper arm wrench including a first handle portion and a first wiper arm holding portion having a first jaw defining a first wiper arm gripping slot with a first wiper arm insertion opening, the first handle portion, the first wiper arm holding portion and the first jaw being non-movably attached to one another for pivotal movement together about a single pivot axis which passes through the first wiper arm gripping slot;
    a second wiper arm wrench including a second handle portion and a second wiper arm holding portion having a second jaw defining a second wiper arm gripping slot with a second wiper arm insertion opening, the second handle portion, the second wiper arm holding portion and the second jaw being non-movably attached to one another for pivotal movement together about the single pivot axis which further passes through the second wiper arm gripping slot; and
    a coupling member being rigidly and non-rotatably fixed to the first wiper arm holding portion and directly contacting and retaining the second wiper arm holding portion, pivotally coupling the first wiper arm holding portion to the second wiper arm holding portion such that the first wiper arm holding portion and the second wiper arm holding portion rotate relative to one another about the single pivot axis, the coupling member having a wiper arm receiving space partially surrounding the single pivot axis and axially aligned with the first and second wiper arm gripping slots along the single pivot axis, the wiper arm receiving space defining a third wiper arm insertion opening,
    the first, second and third wiper arm insertion openings being arranged relative to the single pivot axis such that the first and second wiper arm wrenches and the coupling member are configured to engage a wiper arm in a direction transverse to the single pivot axis.

2. The wiper attack angle adjustment tool according to claim 1, wherein
    the first jaw has a pair of first engagement surfaces defining a first width therebetween of the first wiper arm gripping slot at the single pivot axis, and the second jaw has a pair of second engagement surfaces defining a second width therebetween of the second wiper arm gripping slot at the single pivot axis, the second width of the second wiper arm gripping slot being smaller than the first width of the first wiper arm gripping slot.

3. The wiper attack angle adjustment tool according to claim 1, wherein
    at least one of the first and second wiper arm gripping slots of the first and second jaws has a fixed predetermined width in a direction transverse to the single pivot axis.

4. The wiper attack angle adjustment tool according to claim 1, wherein
    each of the first and second wiper arm gripping slots of the first and second jaws has a fixed predetermined width in a direction transverse to the single pivot axis.

5. The wiper attack angle adjustment tool according to claim 1, wherein
    at least one of the first and second wiper arm holding portions includes a base member with a corresponding one of the first and second jaws being removably attached to the base member.

6. The wiper attack angle adjustment tool according to claim 1, wherein
the first and second wiper arm holding portions include first and second base members, respectively, the first and second jaws being removably attached to the first and second base members, respectively.

7. The wiper attack angle adjustment tool according to claim 1, wherein
at least one of the coupling member and the first and second wiper arm wrenches includes a gauge that is indicative of an amount of pivotal movement between the first and second wiper arm holding portions about the single pivot axis relative to an installation position in which the first, second and third wiper arm insertion openings are angularly aligned about the single pivot axis.

8. The wiper attack angle adjustment tool according to claim 7, wherein
the gauge comprises scalar demarcations formed on the at least one of the coupling member and the first and second wiper arm wrenches.

9. The wiper attack angle adjustment tool according to claim 7, wherein
the gauge comprises scalar demarcations formed on a first one of the coupling member and the first and second wiper arm wrenches, and a second one of the coupling member and the first and second wiper arm wrenches includes a pointer formed thereon that is dimensioned to align with respective ones of the scalar demarcations as the first and second wiper arm wrenches rotate relative to one another.

10. The wiper attack angle adjustment tool according to claim 1, wherein
the coupling member includes a first pivot support part fixed to the first wiper arm holding portion and a second pivot support part fixed to the second wiper arm holding portion, the first and second pivot support parts having first and second partial cylindrical surfaces with centers aligned with the single pivot axis.

11. The wiper attack angle adjustment tool according to claim 10, wherein
the first pivot support part is unitarily formed with the first wiper arm holding portion.

12. The wiper attack angle adjustment tool according to claim 1, wherein
the first and second handle portions are adjustably attached to the first and second wiper arm holding portions such that the first and second handle portions are selectively maintained in one of a plurality of positions.

13. The wiper attack angle adjustment tool according to claim 1, wherein
the first and second handle portions are pivotally mounted to the first and second wiper arm holding portions, respectively, about first and second pivot axes.

14. The wiper attack angle adjustment tool according to claim 13, wherein
the first and second handle portions are adjustably attached to the first and second wiper arm holding portions by first and second fasteners that extend along the first and second pivot axes.

15. The wiper attack angle adjustment tool according to claim 1, wherein
the first and second handle portions have attached ends attached to the first and second wiper arm holding portions and free ends, with the first and second handle portions being configured such that the attached ends are closer together than the free ends.

16. The wiper attack angle adjustment tool according to claim 1, wherein
at least one of the first and second handle portions includes a bend such that distal ends of the first and second handle portions are spaced further apart than local ends of the first and second handle portions.

17. A wiper attack angle adjustment tool comprising:
a first wiper arm wrench including a first handle portion and a first wiper arm holding portion having a first jaw defining a first wiper arm gripping slot with a first wiper arm insertion opening;
a second wiper arm wrench including a second handle portion and a second wiper arm holding portion having a second jaw defining a second wiper arm gripping slot with a second wiper arm insertion opening; and
a coupling member pivotally coupling the first and second wiper arm wrenches together about a single pivot axis passing through the first and second wiper arm gripping slots, the coupling member having a wiper arm receiving space partially surrounding the single pivot axis and axially aligned with the first and second wiper arm gripping slots along the single pivot axis, the wiper arm receiving space defining a third wiper arm insertion opening,
the first, second and third wiper arm insertion openings being arranged relative to the single pivot axis such that the first and second wiper arm wrenches and the coupling member are configured to engage a wiper arm in a direction transverse to the single pivot axis,
the coupling member including a first pivot support part fixed to the first wiper arm holding portion and a second pivot support part fixed to the second wiper arm holding portion, the first and second pivot support parts having first and second partial cylindrical surfaces with centers aligned with the single pivot axis, the second pivot support part removably fixed to the second wiper arm holding portion.

18. The wiper attack angle adjustment tool according to claim 17, wherein
the first pivot support part includes a first abutment that faces in a first axial direction parallel to the single pivot axis,
the second pivot support part includes a second abutment that faces in a second axial direction parallel to the single pivot axis and opposite to the first axial direction, and
the first and second abutments cooperate to restrict relative movement of the first and second wiper arm holding portions along the single pivot axis.

19. The wiper attack angle adjustment tool according to claim 17, wherein
the second wiper arm holding portion includes an arc shaped recess,
the first pivot support part includes a constrained portion that is disposed in the arc shaped recess of the second wiper arm holding portion, and
the second pivot support part retains the constrained portion in the arc shaped recess of the second wiper arm holding portion.

20. A wiper attack angle adjustment tool comprising:
a first wiper arm wrench including a first handle portion and a first wiper arm holding portion having a first jaw defining a first wiper arm gripping slot with a first wiper arm insertion opening;
a second wiper arm wrench including a second handle portion and a second wiper arm holding portion having a second jaw defining a second wiper arm gripping slot with a second wiper arm insertion opening; and a coupling member being rigidly and non-rotatably fixed to the first wiper arm holding portion and directly contacting and retaining the second wiper arm holding portion, pivotally coupling the first and second wiper arm wrenches together about a single pivot axis passing through the first and second wiper arm gripping slots, the coupling member having a wiper arm receiving space partially surrounding the single pivot axis and axially aligned with the first and second wiper arm gripping slots along the single pivot axis, the wiper arm receiving space defining a third wiper arm insertion opening, the first, second and third wiper arm insertion openings being arranged relative to the single pivot axis such that the first and second wiper arm wrenches and the coupling member are configured to engage a wiper arm in a direction transverse to the single pivot axis, and the first and second handle portions extending along first and second longitudinal axes that are each transverse to the direction in which the first and second wiper arm wrenches and the coupling member are configured to engage the wiper arm, the first and second longitudinal axes being spaced apart from the single pivot axis and having non-intersecting relationships therewith.

* * * * *